United States Patent
Azuma et al.

(10) Patent No.: US 12,539,597 B2
(45) Date of Patent: Feb. 3, 2026

(54) ROBOT SYSTEM, AND CONTROL METHOD FOR SAME

(71) Applicant: KAWASAKI JUKOGYO KABUSHIKI KAISHA, Kobe (JP)

(72) Inventors: Kentaro Azuma, Kobe (JP); Jun Takebayashi, Kobe (JP); Tomoki Sakuma, Kobe (JP); Masahiko Akamatsu, Kobe (JP); Takanori Kozuki, Kobe (JP); Jun Fujimori, Kobe (JP); Hiroki Kinoshita, Kobe (JP); Kai Shimizu, Kobe (JP); Hiroki Takahashi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 236 days.

(21) Appl. No.: 18/248,067

(22) PCT Filed: Oct. 5, 2021

(86) PCT No.: PCT/JP2021/036877
§ 371 (c)(1),
(2) Date: Apr. 6, 2023

(87) PCT Pub. No.: WO2022/075333
PCT Pub. Date: Apr. 14, 2022

(65) Prior Publication Data
US 2023/0373078 A1 Nov. 23, 2023

(30) Foreign Application Priority Data

Oct. 7, 2020 (JP) .................................. 2020-169900

(51) Int. Cl.
*B25J 9/00* (2006.01)
*B25J 3/00* (2006.01)
(Continued)

(52) U.S. Cl.
CPC ............. *B25J 3/00* (2013.01); *B25J 9/1633* (2013.01); *B25J 9/1664* (2013.01); *B25J 13/082* (2013.01)

(58) Field of Classification Search
CPC .......... B25J 3/00; B25J 9/1633; B25J 9/1664; B25J 13/082; B25J 11/0065; B25J 3/04;
(Continued)

(56) References Cited

U.S. PATENT DOCUMENTS

| 2007/0010913 A1* | 1/2007 | Miyamoto | B25J 9/1658 700/264 |
| 2008/0027580 A1* | 1/2008 | Zhang | B25J 9/1633 700/245 |

(Continued)

FOREIGN PATENT DOCUMENTS

| CN | 104626152 A | * | 5/2015 | |
| CN | 108972538 A | * | 12/2018 | B25J 9/1697 |

(Continued)

OTHER PUBLICATIONS

H06214633A_Drawings (Year: 1994).*
(Continued)

*Primary Examiner* — Ramon A. Mercado
*Assistant Examiner* — Shaheda Shabnam Hoque
(74) *Attorney, Agent, or Firm* — METROLEX IP LAW GROUP, PLLC; Robert L. Scott, Esq.

(57) ABSTRACT

A controller of a robot system performs first control of controlling a robot arm in accordance with an operation with an operator to thereby cause an end effector to apply a treatment to an object and of recording trajectory data and second control of controlling the robot arm based on the trajectory data recorded in the first control to thereby move the end effector such that the end effector reproduces a moving trajectory and applies a treatment to the object. In
(Continued)

the second control, in controlling the robot arm based on the trajectory data, the controller controls a pressing force of the end effector against the object.

18 Claims, 7 Drawing Sheets

(51) Int. Cl.
    *B25J 9/16*           (2006.01)
    *B25J 13/08*         (2006.01)

(58) Field of Classification Search
    CPC ............... B25J 9/1684; B25J 9/1689; G05B 2219/45065
    See application file for complete search history.

(56) References Cited

U.S. PATENT DOCUMENTS

| | | | |
|---|---|---|---|
| 2014/0067117 A1* | 3/2014 | Orita | B25J 9/1633 700/250 |
| 2015/0066051 A1* | 3/2015 | Kwon | A61B 34/76 606/130 |
| 2017/0028553 A1* | 2/2017 | Tsuda | G06N 3/088 |
| 2018/0256271 A1* | 9/2018 | Tojo | B25J 9/1664 |
| 2018/0319013 A1* | 11/2018 | Shimodaira | B25J 9/163 |
| 2019/0047155 A1* | 2/2019 | Okuyama | B25J 13/085 |
| 2019/0329415 A1 | 10/2019 | Takeuchi | |
| 2020/0030995 A1* | 1/2020 | Lu | B65G 1/0435 |
| 2020/0139539 A1 | 5/2020 | Hasunuma et al. | |
| 2020/0180157 A1* | 6/2020 | Ueda | B25J 9/1015 |
| 2022/0076984 A1* | 3/2022 | Durand | H01L 21/6838 |

FOREIGN PATENT DOCUMENTS

| | | | | |
|---|---|---|---|---|
| CN | 110405753 A | | 11/2019 | |
| CN | 110561421 A | * | 12/2019 | ............ B25J 9/0081 |
| CN | 111336210 A | * | 6/2020 | ............ F16F 15/002 |
| CN | 113635297 A | * | 11/2021 | |
| CN | 114952843 A | * | 8/2022 | |
| JP | H06214633 A | * | 8/1994 | |
| JP | H08-141961 A | | 6/1996 | |
| JP | H08281573 A | * | 10/1996 | |
| JP | 2000084871 A | * | 3/2000 | |
| JP | 2015-85496 A | | 5/2015 | |
| JP | 2017030137 A | * | 2/2017 | ............ B25J 13/00 |
| JP | 2018206286 A | * | 12/2018 | ............ B25J 9/163 |
| JP | 2020104216 A | * | 7/2020 | ............ B25J 3/04 |
| WO | WO-2012108519 A1 | * | 8/2012 | ............ B23Q 1/152 |
| WO | WO-2017033356 A1 | * | 3/2017 | ............ A61B 34/32 |
| WO | 2018/225862 A1 | | 12/2018 | |

OTHER PUBLICATIONS

104626152A_Drawings (Year: 2015).*
111336210A_Drawings (Year: 2020).*
2018206286A_Drawings (Year: 2018).*
High Efficiency Off-line Programming for Robotic Blisk Grinding with Constant Contact Force, 2018 IEEE International Conference on Mechatronics and Automation (ICMA), Changchun, China, 2018, pp. 1440-1445 (Year: 2018).*

* cited by examiner

ROBOT SYSTEM, AND CONTROL METHOD FOR SAME

TECHNICAL FIELD

The technique disclosed here relates to a robot system and a control method for the robot system.

BACKGROUND ART

A robot system known to date applies a treatment to an object by operating a robot.

Patent Document 1, for example, discloses a robot system that polishes an object by operating a robot. In this robot system, the robot moves such that a constant polishing force is exerted on the object.

CITATION LIST

Patent Document

Patent Document 1: Japanese Patent Application Publication No. 2015-85496

SUMMARY OF THE INVENTION

In the robot system described above, however, the robot only moves such that a force exerted on the object is kept constant. In the case of applying a treatment to an object by actually operating the robot by a user, the robot moves in a complicated manner in some cases. That is, the robot system described above cannot reproduce a complicated action of the robot similar to an action when actually operated by the user.

It is therefore an object of the technique disclosed here to reproduce a complicated action of a robot similar to an action actually operated by a user in applying a treatment to an object by operating the robot.

A robot system disclosed here includes: a master device that is operated by a user; a slave device including an effector that applies a treatment to an object and a mover that moves the effector; and a controller that controls the slave device, wherein the controller performs first control of controlling the mover in accordance with an operation with the master device to thereby cause the effector to apply a treatment to the object and of recording trajectory information related to a moving trajectory of the effector, and second control of controlling the mover based on the trajectory information recorded in the first control to thereby move the effector such that the effector reproduces the moving trajectory and applies a treatment to the object, and in the second control, in controlling the mover based on the trajectory information, the controller controls a pressing force of the effector against the object. The term "reproduce" herein does not require strict reproducibility. That is, the term "reproduce" includes not only strict reproduction but also general reproduction.

This robot system reproduces a complicated action of a robot similar to an action when actually operated by a user in applying a treatment to an object by operating the robot.

DESCRIPTION OF EMBODIMENTS

Exemplary embodiments will be described in detail hereinafter with reference to the drawings.

In this disclosure, jobs conducted by a robot do not include a teaching job and confirmation and correction jobs of teaching. Thus, an operator 2 herein does not include a teaching pendant.

Figure 1:
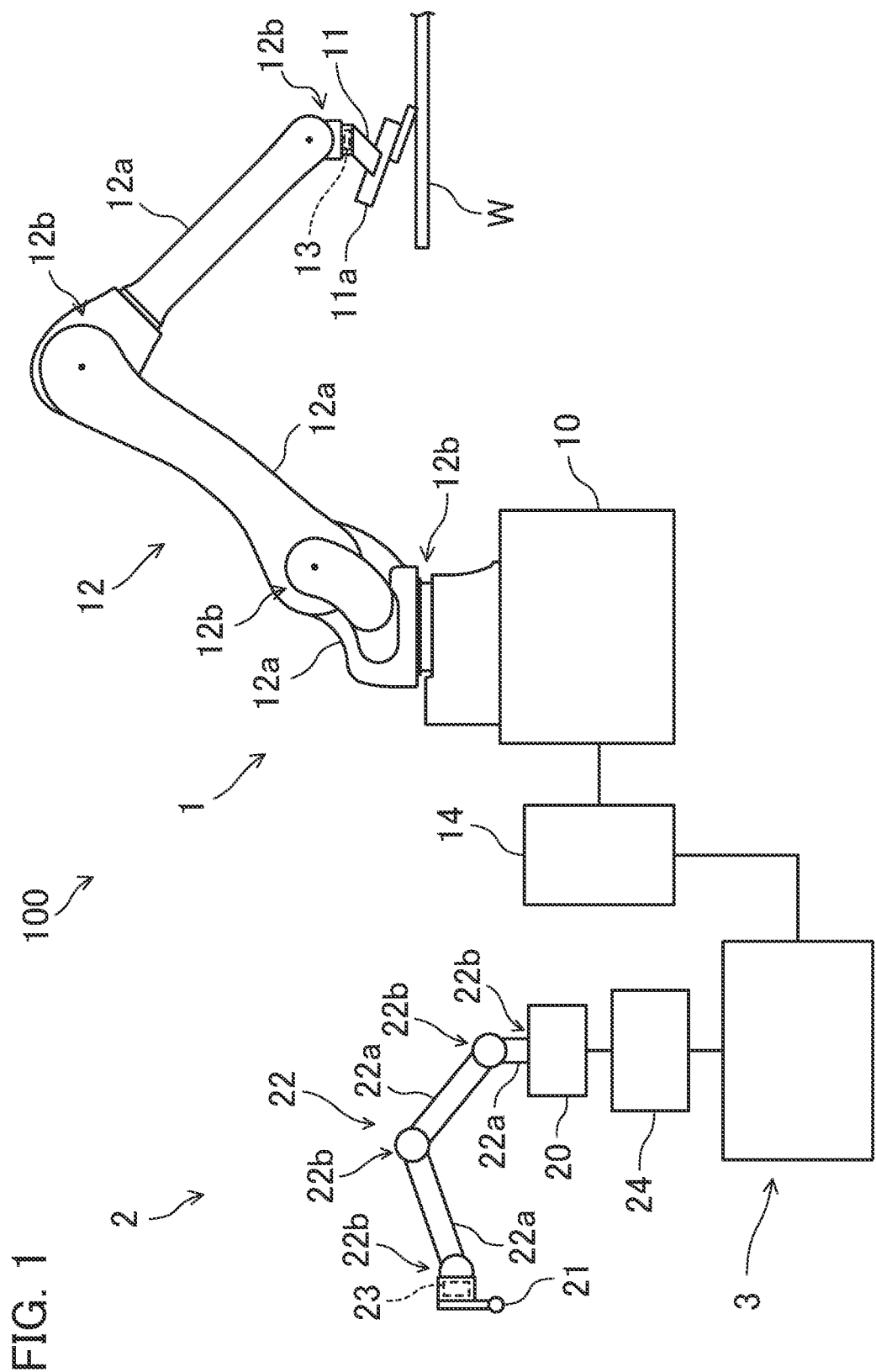
FIG. 1 is a schematic view illustrating a configuration of a robot system according to an embodiment.

FIG. 1 is a schematic view illustrating a configuration of a robot system 100 according to an embodiment.

The robot system 100 includes a robot 1, the operator 2 that is operated by a user, and a controller 3 that controls the robot 1. The robot system 100 is a master-slave system. The operator 2 functions as a master device, and the robot 1 functions as a slave device. The controller 3 controls the entire robot system 100, and performs bilateral control between the robot 1 and the operator 2.

The robot 1 is, for example, an industrial robot. The robot 1 includes an end effector 11 that applies a treatment to an object W, and a robot arm 12 that moves the end effector 11. The robot 1 causes the robot arm 12 to operate, that is, to move, the end effector 11 so that the end effector 11 applies a treatment to the object W. The treatment is, for example, a process.

The robot 1 may further include a contact force sensor 13 that detects a reaction force exerted on the end effector 11 from the object (hereinafter referred to as a "contact force"). The robot 1 may further include a base 10 supporting the robot arm 12, and a robot controller 14 that controls the entire robot 1.

In the robot 1, a robot coordinate system of three orthogonal axes is defined. For example, a Z axis is defined in the top-bottom directions, and an X axis and a Y axis are defined to be orthogonal to each other in the horizontal directions.

The end effector 11 includes a grinding device 11a, and applies grinding as a treatment to the object W. The object W is, for example, a large steel sheet or a wall of a large tank. The treatment applied to the object W by the end effector 11 may not be grinding, and may be cutting, polishing, or other processes. The end effector 11 is an example of an effector.

Examples of the grinding device 11a include a grinder, an orbital sander, a random orbit sander, a delta sander, and a belt sander. The grinder may be of a type that rotates a disc-shaped grindstone, a type that rotates a conical or columnar grindstone, or the like. The grinding device 11a in this example is a grinder.

The robot arm 12 changing a position of the grinding device 11a. The robot arm 12 may change a posture of the grinding device 11a. The robot arm 12 is a vertical articulated robot arm. The robot arm 12 includes links 12a, joints 12b connecting the links 12a, and a servo motor (see FIG. 2) that rotationally drives the joints 12b. The robot arm 12 is an example of a mover.

The robot arm 12 may be of a horizontal articulated type, a parallel link type, a Cartesian coordinate type, a polar coordinate type, or other types.

In this example, the contact force sensor 13 is located between the robot arm 12 and the end effector 11 (specifically, in a coupling part between the robot arm 12 and the end effector 11). The contact force sensor 13 detects forces along three orthogonal axes and moments around the three axes. The contact force sensor 13 is an example of a contact force detector.

The contact force detector is not limited to the contact force sensor 13. For example, the contact force sensor 13 may detect only forces in uniaxial, biaxial, or triaxial directions. Alternatively, the contact force detector may be a sensor such as a current sensor that detects a current of the servo motor 15 of the robot arm 12 or a torque sensor that detects a torque of the servo motor 15.

Figure 2:
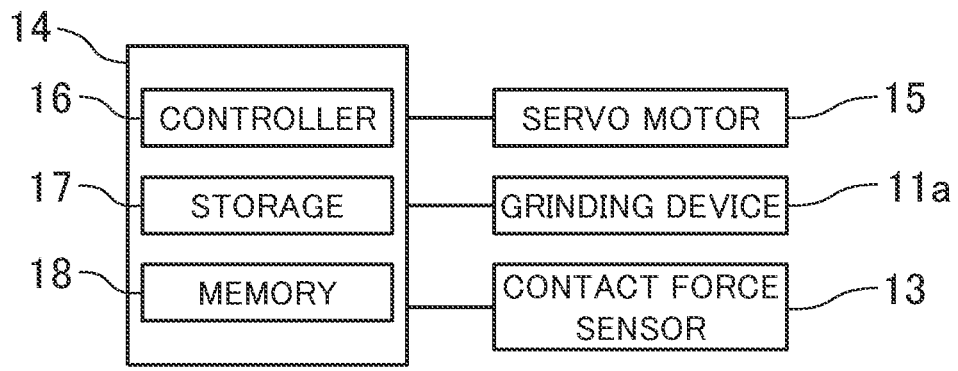
FIG. 2 illustrates a schematic hardware configuration of a robot controller.

FIG. 2 illustrates a schematic hardware configuration of the robot controller 14. The robot controller 14 controls the servo motor 15 of the robot arm 12 and the grinding device 11a. The robot controller 14 receives a detection signal of the contact force sensor 13. The robot controller 14 transmits and receives information, instructions, data, and others to/from the controller 3. The robot controller 14 includes a controller 16, a storage 17, and a memory 18.

The controller 16 controls the entire robot controller 14. The controller 16 performs various computations. For example, the controller 16 is a processor such as a central processing unit (CPU). The controller 16 may be a micro controller unit (MCU), a micro processor unit (MPU), a field programmable gate array (FPGA), a programmable logic controller (PLC), or the like.

The storage 17 stores programs and various types of data to be executed by the controller 16. The storage 17 is a nonvolatile memory, a hard disc drive (HDD), or a solid state drive (SSD), for example.

The memory 18 temporarily stores data or other information. For example, the memory 18 is a volatile memory.

As illustrated in FIG. 1, the operator 2 includes a handle 21 that is operated by a user and an operating force sensor 23 that detects an operating force exerted on the handle 21 by a user. The operator 2 receives an input for manually operating the robot 1, and outputs operation information that is input information to the controller 3. Specifically, the user operates the operator 2 while holding the handle 21. A force exerted on the handle 21 at this time is detected by the operating force sensor 23. The operating force detected by the operating force sensor 23 is output to the controller 3 as operation information.

The operator 2 may further include a base 20, a support 22 that is disposed on the base 20 and supports the handle 21, and an operation controller 24 that controls the entire operator 2. The operator 2 applies a reaction force against the operating force to the user by control from the controller 3. Specifically, in response to an instruction from the controller 3, the operation controller 24 controls the support 22 to cause the user to sense the reaction force.

In the operator 2, an operation coordinate system of three orthogonal axes is defined. The operation coordinate system corresponds to a robot coordinate system. That is, the Z axis is defined in the top-bottom directions, and the X axis and the Y axis are defined to be orthogonal to each other in the horizontal directions.

The support 22 includes links 22a, joints 22b connecting the links 22a, and a servo motor 25 (see FIG. 3) that rotationally drives the joints 22b. The support 22 supports the handle 21 such that the handle 21 can take any position and any posture in three-dimensional space. In accordance with the position and posture of the handle 21, the servo motor 25 rotates. The amount of rotation, that is, the rotation angle, of the servo motor 25 is uniquely determined.

In this example, the operating force sensor 23 is located between the handle 21 and the support 22 (specifically, in a coupling part between the handle 21 and the support 22). The operating force sensor 23 detects forces along three orthogonal axes and moments around the three axes. The operating force sensor 23 is an example of an operating force detector.

The operating force detector is not limited to the operating force sensor 23. For example, the operating force sensor 23 may detect only forces in uniaxial, biaxial, or triaxial directions. Alternatively, the operating force detector may be a sensor such as a current sensor that detects a current of the servo motor 25 of the support 22 or a torque sensor that detects a torque of the servo motor 25.

Figure 3:
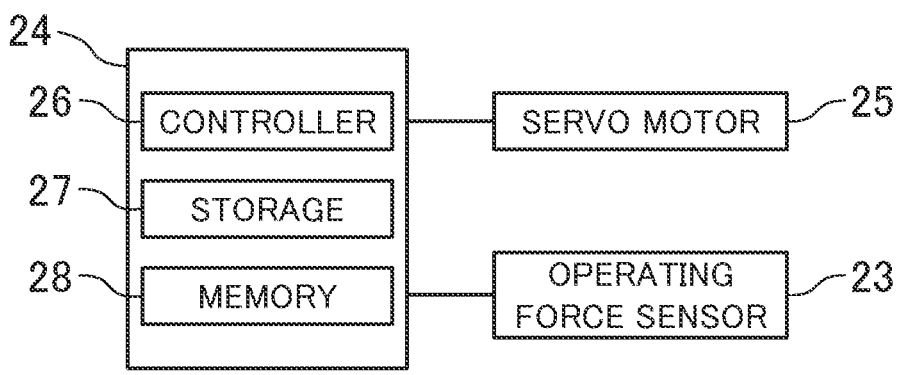
FIG. 3 illustrates a schematic hardware configuration of an operation controller.

FIG. 3 illustrates a schematic hardware configuration of the operation controller 24. The operation controller 24 operates the support 22 by controlling the servo motor 25. The operation controller 24 receives a detection signal of the operating force sensor 23. The operation controller 24 transmits and receives information, instructions, data, and others to/from the controller 3. The operation controller 24 includes the controller 26, the storage 27, and the memory 28.

The controller 26 controls the entire operation controller 24. The controller 26 performs various computations. For example, the controller 26 is a processor such as a central processing unit (CPU). The controller 26 may be a micro controller unit (MCU), a micro processor unit (MPU), a field programmable gate array (FPGA), a programmable logic controller (PLC), or the like.

The storage 27 stores programs and various types of data to be executed by the controller 26. The storage 27 is a nonvolatile memory, a hard disc drive (HDD), or a solid state drive (SSD), for example.

The memory 28 temporarily stores data or other information. For example, the memory 28 is a volatile memory.

The controller 3 controls the robot 1 and the operator 2. The controller 3 executes first control and second control. In the first control, the robot arm 12 is controlled in accordance with an operation with the operator 2 so that the end effector 11 applies a treatment to the object W and trajectory information related to a moving trajectory of the end effector 11 is recorded. In the second control, the robot arm 12 is controlled based on the trajectory information recorded in the first control so that the end effector 11 moves to reproduce the moving trajectory and applies a treatment to the object W. In the second control, the controller 3 controls a pressing force of the end effector 11 against the object W in controlling the robot arm 12 based on the trajectory information.

Figure 4:
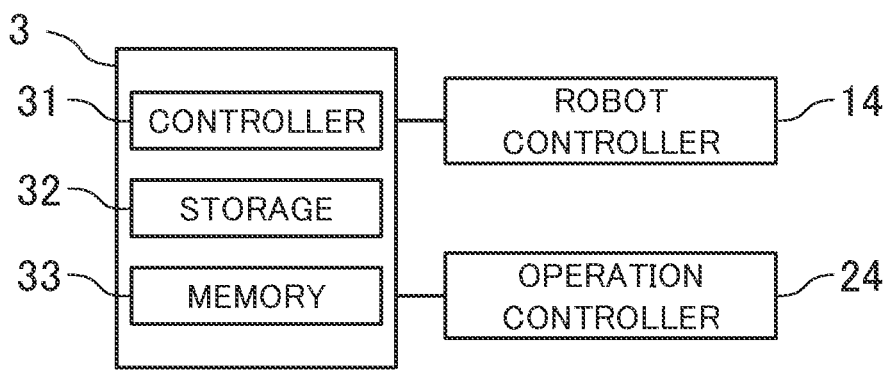
FIG. 4 illustrates a schematic hardware configuration of a controller.

FIG. 4 illustrates a schematic hardware configuration of the controller 3. The controller 3 transmits and receives information, instructions, data, and others to/from the robot controller 14 and the operation controller 24. The controller 3 includes a controller 31, a storage 32, and a memory 33.

The controller 31 controls the entire controller 3. The controller 31 performs various computations. For example, the controller 31 is a processor such as a central processing unit (CPU). The controller 31 may be a micro controller unit (MCU), a micro processor unit (MPU), a field programmable gate array (FPGA), a programmable logic controller (PLC), or the like.

The storage 32 stores programs and various types of data to be executed by the controller 31. The storage 32 is a nonvolatile memory, a hard disc drive (HDD), or a solid state drive (SSD), for example.

The memory 33 temporarily stores data or other information. For example, the memory 33 is a volatile memory.

Figure 5:
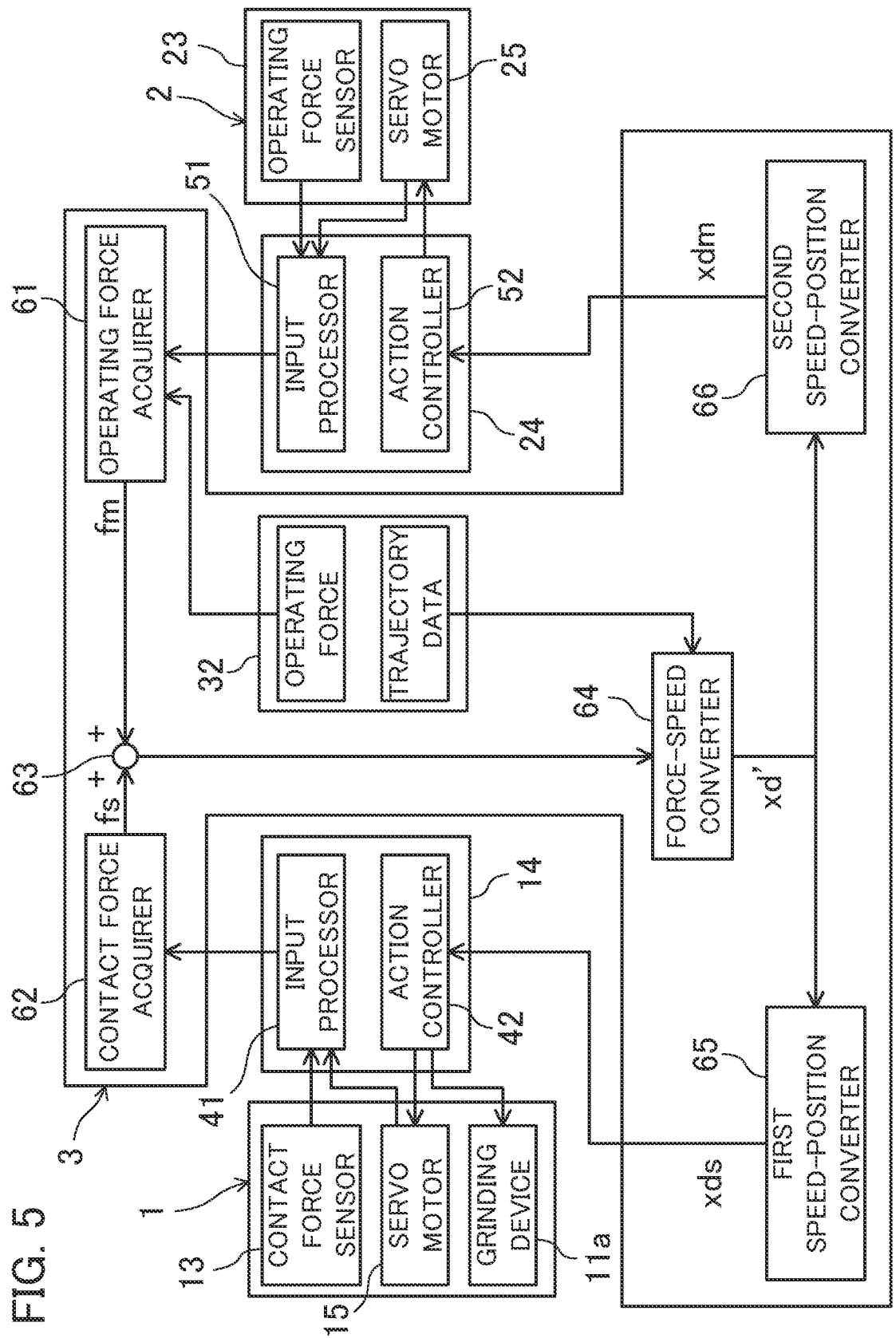
FIG. 5 is a block diagram illustrating a configuration of a control system of a robot system.

FIG. 5 is a block diagram illustrating a configuration of a control system of the robot system 100.

The controller 16 of the robot controller 14 reads programs from the storage 17 and develops the programs to the memory 18 to thereby operate various functions. Specifically, the controller 16 functions as an input processor 41 and an action controller 42.

The input processor 41 outputs information, data, instructions, and others received from the contact force sensor 13 and the servo motor 15 to the controller 3. Specifically, the input processor 41 receives detection signals of forces in six axes from the contact force sensor 13 and outputs the detection signals to the controller 3. The input processor 41 receives detection signals of a rotation sensor (e.g., encoder) and a current sensor from the servo motor 15. The input processor 41 outputs the detection signals to the action controller 42 for feedback control of the robot arm 12 by the action controller 42. The input processor 41 outputs the detection signals as positional information of the robot arm 12 to the controller 3.

The action controller 42 receives an instructed position xds from the controller 3 and generates a control instruction for operating the robot arm 12 in accordance with the instructed position xds. The action controller 42 outputs the control instruction to the servo motor 15 and operates the robot arm 12 to move the grinding device 11a to a position corresponding to the instructed position. At this time, the action controller 42 performs feedback control on an action of the robot arm 12 based on a detection signal of a rotation sensor and/or a current sensor of the servo motor 15 from the input processor 41. The action controller 42 outputs a control instruction to the grinding device 11a and works the grinding device 11a. Accordingly, the grinding device 11a grinds the object W.

The controller 26 of the operation controller 24 reads programs from the storage 27 and develops the programs to the memory 28 to thereby operate various functions. Specifically, the controller 26 functions as an input processor 51 and an action controller 52.

The input processor 51 outputs information, data, instructions, and others received from the operating force sensor 23 to the controller 3. Specifically, the input processor 51 receives detection signals of forces in six axes from the operating force sensor 23 and outputs the detection signals to the controller 3. The input processor 51 receives detection signals of a rotation sensor (e.g., encoder) and a current sensor from the servo motor 25. The input processor 51 outputs the detection signals to the action controller 52 for feedback control of the support 22 by the action controller 52.

The action controller 52 receives an instructed position xdm from the controller 3 and generates a control instruction for operating the support 22 in accordance with the instructed position xdm. The action controller 52 outputs the control instruction to the servo motor 25, operates the support 22, and moves the handle 21 to a position corresponding to the instructed position. At this time, the action controller 52 performs feedback control on an action of the support 22 based on a detection signal of a rotation sensor and/or a current sensor of the servo motor 25 from the input processor 51. Accordingly, a reaction force is exerted against an operating force exerted on the handle 21 by a user. Consequently, the user can operate the handle 21, while sensing a pseudo reaction force of the object W from the handle 21.

The controller 31 of the operation controller 3 reads programs from the storage 32 and develops the programs to the memory 33 to thereby operate various functions. Specifically, the controller 31 functions an operating force acquirer 61, a contact force acquirer 62, an adder 63, a force-speed converter 64, a first speed-position converter 65, and a second speed-position converter 66.

The operating force acquirer 61 receives a detection signal of the operating force sensor 23 through the input processor 51, and acquires an operating force fm based on the detection signal. The operating force acquirer 61 inputs the operating force fm to the adder 63.

The contact force acquirer 62 receives a detection signal of the contact force sensor 13 through the input processor 41, and acquires a contact force fs based on the detection signal. The contact force acquirer 62 inputs the contact force fs to the adder 63.

The adder 63 calculates a sum of the operating force fm input from the operating force acquirer 61 and the contact force fs input from the contact force acquirer 62. In this example, since the operating force fm and the contact force fs are in opposite directions, the operating force fm and the contact force fs have different positive/negative signs. That is, addition of the operating force fm and the contact force fs reduces the absolute value of the operating force fm.

The force-speed converter 64 converts a resultant force fm+fs that is the sum of the operating force fm and the contact force fs to an instructed speed xd'. The force-speed converter 64 calculates the instructed speed xd' by using a motion model based on an equation of motion including an inertia coefficient, a viscosity coefficient (damper coefficient), and a rigidity coefficient (spring coefficient). Specifically, the force-speed converter 64 calculates the instructed speed xd' based on the equation of motion:

[Eq. 1]

$$md \cdot e'' + cd \cdot e' + kd \cdot e = fm + fs \quad (1)$$

where e=xd−xu, xd is an instructed position, and xu is trajectory data described later. If there is no trajectory data, e=xd. In addition, and is an inertia coefficient, cd is a viscosity coefficient, kd is a rigidity coefficient, fm is an operating force, and fs is a contact force. In the equation, "'" represents one time differentiation, and "''" represents two times differentiation.

Equation (1) is a linear differential equation. When Equation (1) is solved for xd', Equation (2) is given.

[Eq. 2]

$$xd' = xu' + A \quad (2)$$

where A is a term represented by fm, fs, md, cd, kd, etc.

Equation (2) is stored in the storage 32. The force-speed converter 64 reads Equation (2) from the storage 32 and obtains an instructed speed xd', and outputs the obtained instructed speed xd' to the first speed-position converter 65 and the second speed-position converter 66. The instructed speed xd' is an example of position-related information related to the position of the end effector 11.

The first speed-position converter 65 converts the instructed speed xd' subjected to coordinate conversion to an instructed position xds for the robot 1 with reference to a robot coordinate system. For example, in a case where a ratio of the amount of movement of the robot to the amount of movement of the operator 2 is set, the first speed-position converter 65 obtains an instructed position xds by multiplying the instructed position xd obtained from the instructed speed xd' in accordance with the movement ratio. The first speed-position converter 65 outputs the obtained instructed position xds to the robot controller 14, specifically, the action controller 42.

The second speed-position converter 66 converts the instructed speed xd' to an instructed position xdm for the operator 2 with reference to the operation coordinate system. The second speed-position converter 66 outputs the obtained instructed position xdm to the operation controller 24, specifically, the action controller 52. In a manner similar to the instructed position xds for the end effector 11, the instructed position xdm is obtained based on the instructed speed xd'. Thus, the instructed position xdm is related to the instructed position xds.

[Action of Robot System]

Figure 6:
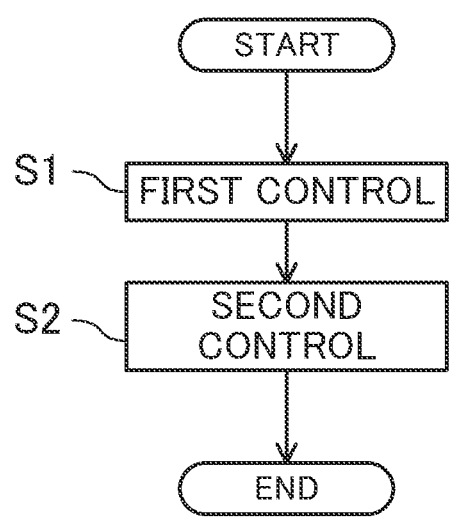
FIG. 6 is a flowchart depicting an action of the robot system.

Next, an action of the thus-configured robot system 100 will be described. FIG. 6 is a flowchart depicting an action of the robot system 100. The robot system 100 performs first control in step S1, and then performs second control in step S2. Both of the first control and the second control include an actual job of grinding the object W by the grinding device 11*a*. It should be noted that in the first control, a user manually controls an action of the robot 1 with the operator 2. On the other hand, in the second control, the controller 3 basically automatically controls an action of the robot 1.

In the first control, trajectory information related to a moving trajectory of the end effector 11 is recorded in grinding the object W by the end effector 11 (i.e., grinding device 11*a*).

In the second control, the robot arm 12 is controlled based on the trajectory information to cause the end effector 11 to reproduce the moving trajectory in the first control. At this time, a pressing force of the end effector 11 against the object W is controlled.

The first control and the second control will now be specifically described.

<First Control>

In first control, the user operates the operator 2 to cause the robot 1 to execute an actual job on the object W. That is, the user operates the operator 2 to perform grinding on the object W with the robot 1. As an operation by the user with the operator 2, an operating force applied to the handle 21 by the user is detected by the operating force sensor 23. The robot arm 12 is controlled in accordance with the operating force.

Specifically, when the user operates the operator 2, the operating force sensor 23 detects an operating force exerted by the user through the handle 21. The operating force detected by the operating force sensor 23 is input as a detection signal to the controller 3 by the input processor 51. In the controller 3, the operating force acquirer 61 inputs an operating force fm based on the detection signal to the adder 63.

In this process, a contact force detected by the contact force sensor 13 of the robot 1 is input as a detection signal to the contact force acquirer 62 of the controller 3 through the input processor 41. The contact force acquirer 62 inputs a contact force fs based on the detection signal to the adder 63.

The adder 63 inputs a resultant force fm+fs to the force-speed converter 64. The force-speed converter 64 obtains an instructed speed xd' based on Equation (2) using the resultant force fm+fs.

Regarding the robot 1, the first speed-position converter 65 obtains an instructed position xds from the instructed speed xd'. The action controller 42 of the robot controller 14 moves the robot arm 12 in accordance with the instructed position xds and controls the position of the grinding device 11*a*. Accordingly, the object W is ground by the grinding device 11*a* with a pressing force in accordance with the operating force fm applied to the object W.

On the other hand, in the operator 2, the second speed-position converter 66 obtains an instructed position xdm from the instructed speed xd'. The action controller 52 of the operation controller 24 operates the support 22 in accordance with the instructed position xdm and controls the position of the handle 21. In this manner, the user senses a reaction force in accordance with a contact force fs.

The user continues an actual job based on such an operation of the operator 2, and the controller 3 records trajectory data xu during the actual job in the storage 32.

The trajectory data xu herein refers to trajectory information related to a moving trajectory of the end effector 11 (i.e., grinding device 11*a*). In the controller 3, the instructed positions xdm, the instructed positions xds, and the instructed speeds xd' are the trajectory information related to the moving trajectory of the end effector 11. In this example, the controller 3 records the instructed positions xdm in the storage 32 as trajectory data xu. It should be noted that the instructed positions xds or the instructed speeds xd' may be recorded in the storage 32 as trajectory data xu.

In addition, in recording the trajectory data xu, the controller 3 also records operating forces detected by the operating force sensor 23. In this example, as the operating forces detected by the operating force sensor 23, operating forces fm from the operating force acquirer 61 are recorded. The controller 3 records the trajectory data xu and the operating forces fm in the storage 32 in association with each other as an operation history.

<Second Control>

Second control is performed after completion of the first control. For example, the first control is performed on a part of an object W or on one of objects W. For example, in the case of grinding a large steel sheet as an object W, an actual job by the first control is performed on a part of the steel sheet. Then, an actual job by the second control is performed on the other part of the steel sheet. In the case of grinding a relatively small object W, an actual job by the first control is performed on one object W. Then, an actual job by the second control is performed on another object W.

In the second control, the controller 3 controls the robot arm 12 based on trajectory information and operating forces. In this example, operating forces fm used in control of the robot arm 12 are operating forces fm (hereinafter referred to as "history operating forces fm") recorded in the first control.

Specifically, in the second control, the controller 3 generates instructed positions xds for the robot 1 based on the trajectory data xu and the history operating forces fm. At this time, an operation of the operator 2 by a user is not performed.

Specifically, the force-speed converter 64 obtains instructed speeds xd' by converting the trajectory data xu to history speeds xu' and substituting the history speeds xu' in Equation (2). At this time, the force-speed converter 64 also substitutes each history operating force fm in the Equation (2). It should be noted that the contact force fs is an actual contact force fs when the robot 1 actually operates, that is, a current contact force fs.

Based on the thus-obtained instructed speeds xd', instructed positions xds are finally generated. The robot controller 14 controls the robot 1 based on the generated instructed positions xds, and controls the position of the grinding device 11*a*.

The controller 3 neither generates nor outputs instructed positions xdm for the operator 2. That is, the operator 2 does not control the positions of the handle 21.

In the manner described above, in the second control, the end effector 11, that is, the grinding device 11*a*, moves to reproduce the trajectory data xu under the influence of the history operating force fm, thereby grinding an object W. That is, the grinding device 11*a* does not simply reproduce the trajectory data xu but is pushed against an object W with a pressing force in accordance with the history operating force fm. As a result, the robot system 100 easily imitates complicated operation and complicated force exertion actually performed by a user to move the grinding device 11*a*.

<Functions in Second Control>

The robot system 100 has functions using the controls described above as basic controls. Functions of the robot system 100 will now be described.

As a function, the robot system 100 is configured to select the presence or absence of a rigidity coefficient kd in Equation (1). That is, the presence or absence of an elastic force in a motion model of the end effector 11 and the robot arm 12 is selected. In the case of rigidity coefficient kd=0, the effect of a damping force increases in the motion model. Control in the case of rigidity coefficient kd=0 will be hereinafter referred to as attenuation control, and control in a case where rigidity coefficient kd is not zero will be hereinafter referred to as elastic control. That is, the robot system 100 can switch between the attenuation control and the elasticity control.

<Attenuation Control>

Figure 7:
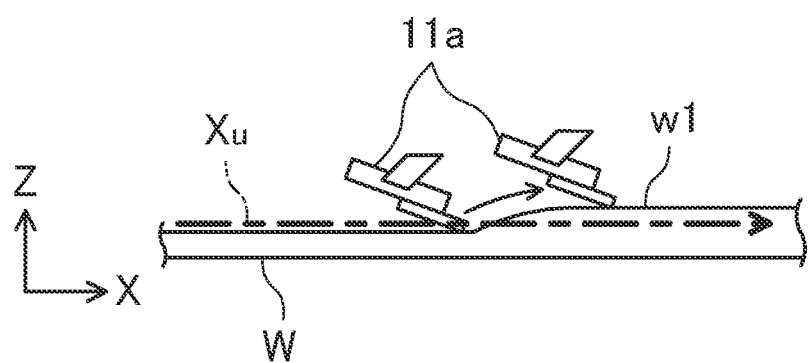
FIG. 7 schematically illustrates movement of a grinding device in attenuation control.

First, basic attenuation control will be described. FIG. 7 schematically illustrates movement of the grinding device 11*a* in attenuation control. For example, it will be described how the grinding device 11*a* moves in griding the object W illustrated in FIG. 7.

The trajectory data xu is a linear trajectory whose component Y and component Z are constant and only component X changes. On the other hand, a protruding portion w1 is present in the surface of the object W.

In second control, the robot 1 moves the grinding device 11*a* to reproduce trajectory data xu and a history operating force fm. In a portion away from the trajectory data xu such as the protruding portion w1, under the influence of a viscosity coefficient cd, that is, the effect of a viscous force, the grinding device 11*a* moves along the surface of the protruding portion w1 or moves with a decrease in speed in the direction X, in accordance with the history operating force fm. That is, although the grinding device 11*a* slightly deviates from the trajectory data xu, the grinding device 11*a* moves to achieve a pressing force in accordance with the history operating force fm.

Note that in the case of reproducing the trajectory data xu without consideration of the operating force fm, the grinding device 11*a* moves to follow the trajectory data xu strictly. Thus, even when the grinding device 11*a* contacts the protruding portion w1, the robot 1 continues to cause the grinding device 11*a* to follow the trajectory data xu strictly. Accordingly, an excessive contact force fs might be exerted on the grinding device 11*a*.

In the manner described above, in the attenuation control, the grinding device 11*a* moves, that is, grinds, to follow the shape of the protruding portion w1 with a decrease in speed. Consequently, exertion of an excessive contact force fs on the grinding device 11*a* is avoided.

<Selection of Control Direction>

Another function of the robot system 100 will now be described using the attenuation control as an example. The robot system 100 is capable of selecting a component of a direction in which the trajectory data xu is reproduced and a component of a direction in which a history operating force fm is controlled from components of directions included in the trajectory data xu and the history operating force fm.

That is, each of the trajectory data xu and the history operating force fm include, as the components of the directions, a component of the X direction, a component of the Y direction, a component of the Z direction, a component around the X axis, a component around the Y axis, and a component around the Z axis. In the second control, the controller 3 is capable of selecting a component of a direction to be used in controlling the robot arm 12 from the components of the directions included in the trajectory data xu and selecting a component of a direction to be used in controlling the robot arm 12 from the components of the directions included in the history operating force fm. That is, in reproducing the trajectory data xu, it is possible to set which the component of the directions in the trajectory data xu is to be reproduced in the components of the directions. Similarly, in controlling a pressing force of the grinding device 11*a* against the object W, it is possible to set which pressing force of the component of the direction is to be controlled in the components of the directions.

For example, in the second control, the controller 3 uses a component of a part of the directions (e.g., Z component) in the components of the directions included in the history operating force fm for controlling the robot arm 12, and uses a component of another part of the directions in the components of the directions included in the trajectory data xu (e.g., components of the directions other than the Z component) for controlling the robot arm 12. That is, with respect to the directions other than the z-axis direction, the grinding device 11*a* moves to reproduce the trajectory data xu, whereas with respect to the z-axis direction, the grinding device 11*a* moves in accordance with the history operating force fm.

In this example, the function of selecting control directions is described using attenuation control as an example. However, the function of selecting control directions is not limited to attenuation control.

Figure 8:
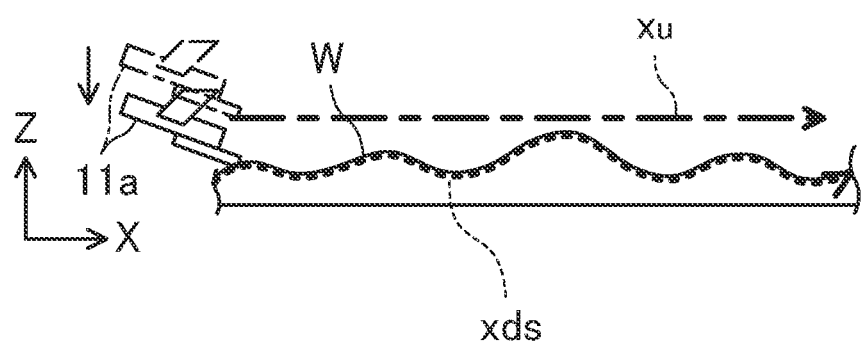
FIG. 8 schematically illustrates movement of the grinding device in attenuation control in which a control direction selecting function is performed.

FIG. 8 schematically illustrates movement of the grinding device 11*a* in attenuation control in which the control direction selecting function is executed. For example, as illustrated in FIG. 8, the trajectory data xu is a linear trajectory whose Y component and Z component are constant and only X component changes. The surface of the object W is uneven in the Z direction.

In this case, the grinding device 11*a* moves to reproduce the history operating force fm in the Z direction and follow the trajectory data xu in the X and Y directions. Under the influence of the viscosity coefficient cd in Equation (1), the grinding device 11a moves to have a relationship of history operating force fm+contact force fs=0 in the Z direction. Consequently, the grinding device 11a moves in accordance with the trajectory data xu in the X and Y directions, while absorbing a deviation between the trajectory data xu and the surface of an actual object W in the Z direction.

In this manner, a pressing force is controlled only in the Z direction and the trajectory data xu is reproduced in the X and Y directions so that the grinding device 11a moves in accordance with the trajectory data xu in the X and Y directions, while absorbing an individual difference of the object W in the Z direction.

<Elasticity Control>

Figure 9:
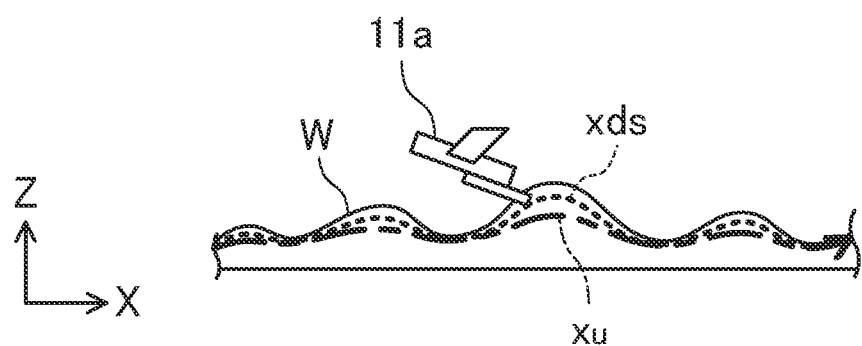
FIG. 9 schematically illustrates movement of the grinding device in elasticity control.

First, basic elasticity control will be described. FIG. 9 schematically illustrates movement of the grinding device 11a in elasticity control. For example, it will be described how the grinding device 11a moves in griding the object W illustrated in FIG. 9. The surface of the object W is uneven in the Z direction, and this uneven pattern spreads in the X direction. The trajectory data xu is a trajectory that is constant in the Y component and fluctuates in the Z component with a change of the X component, and waves in the Z direction in a manner similar to the surface of the object W. It should be noted that upward and downward fluctuations of the trajectory data xu in the Z direction are smaller than upward and downward fluctuations of the surface of the object W in the Z direction.

In this case, the robot 1 operates under the influence of the rigidity coefficient kd in addition to the influence of the viscosity coefficient cd. Specifically, as illustrated in FIG. 9, the grinding device 11a moves along the surface of the object W and, in a portion where a difference between the surface of the object W and the trajectory data xu is large, a pressing force against the object W increases so that the grinding device 11a is forced to move at a position close the trajectory data xu. Consequently, the amount of grinding of the grinding device 11a increases, and accordingly, the object W is grounded to approach the shape of the trajectory data xu.

Figure 10:
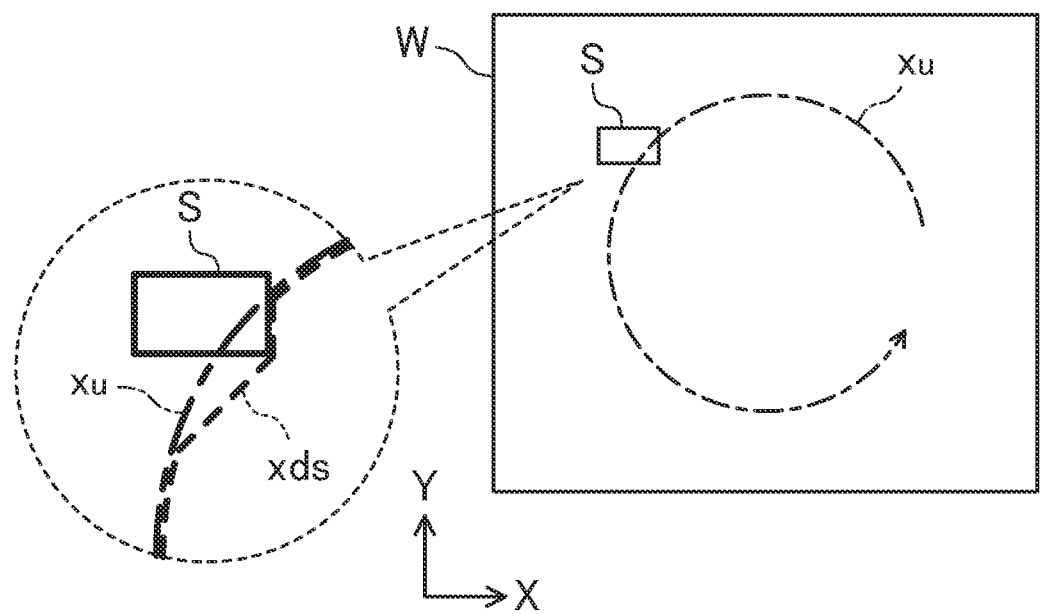
FIG. 10 schematically illustrates movement of the grinding device in elasticity control in another example.

As another example, the case of grinding an object W illustrated in FIG. 10 will be described. FIG. 10 schematically illustrates movement of the grinding device 11a in elasticity control in another example. FIG. 10 is a view when the object W expanding in an XY plane is seen in the Z direction. The trajectory data xu has a substantially arc shape when seen in the Z direction. On the surface of the object W, an obstacle S is present on the trajectory data xu.

In this case, when the grinding device 11a moves in accordance with the trajectory data xu and reaches the obstacle S, a pressing force against the obstacle S increases to approach the shape of the trajectory data xu under the influence of the rigidity coefficient kd. At the same time, under the influence of the viscosity coefficient cd, the grinding device 11a moves along the surface of the obstacle S, while being strongly pushed against the obstacle S. When the grinding device 11a has passed by the obstacle S, the grinding device 11a approaches the shape of the trajectory data xu under the influence of the rigidity coefficient kd. Finally, the grinding device 11a moves in accordance with the trajectory data xu.

In the manner described above, in the elasticity control, the grinding device 11a is controlled with cooperation of an elastic force and an attenuation force. Even in the presence of disturbance such as the obstacle S, the grinding device 11a appropriately avoids the disturbance and moves to follow the trajectory data xu.

<Rigidity Coefficient Change>

Next, as a further function in elasticity control, the robot system 100 is capable of changing the rigidity coefficient kd in accordance with the history operating force fm and the contact force fs in the elasticity control. This function is switched between ON and OFF by setting.

For example, the rigidity coefficient kd is calculated by the following equation:

[Eq. 3]

$$kd = k\max \times \frac{1}{2}\left\{\cos\left(\frac{|fs|}{|fs-\max|}\pi\right) - \cos\left(\frac{|fm|}{|fm-\max|}\pi\right)\right\} \quad (3)$$

if |fs|>|fs−max|, fs=fs−max
if |fm|>|fm−max|, fm=fm−max
if kd<0, kd=0 where kmax is a maximum value of a rigidity coefficient, fm−max is a limiting value of an operating force, and fs−max is a limiting value of a contact force.

Equation (3) is stored in the storage 32. The force-speed converter 64 reads Equation (3) from the storage 32 together with Equation (2) and obtains an instructed speed xd'.

Figure 11:
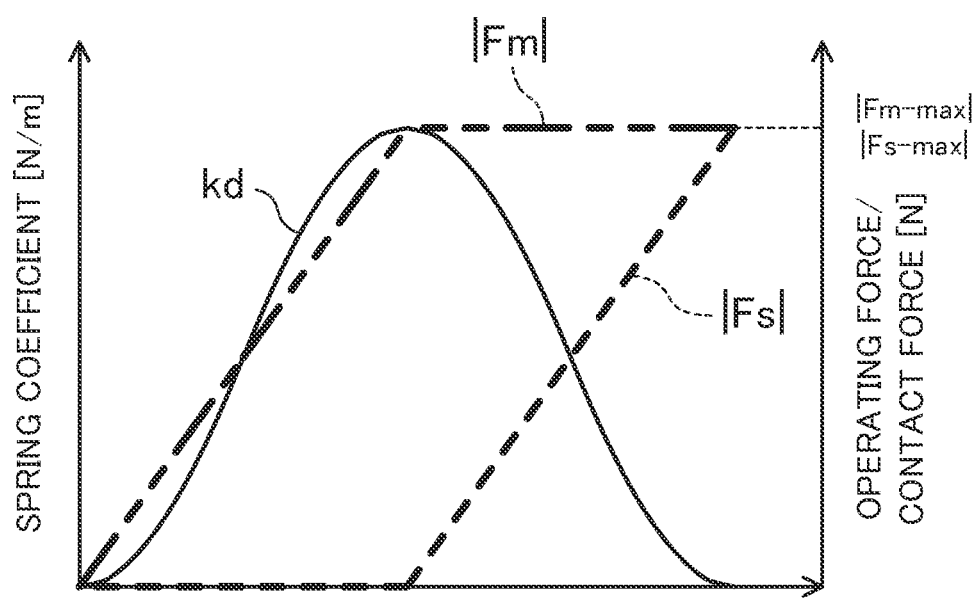
FIG. 11 is a graph showing a change in rigidity coefficient with changes in operating force and contact force.

From Equation (3), the rigidity coefficient kd changes as shown in FIG. 11. FIG. 11 is a graph showing a change in a rigidity coefficient kd with changes in a history operating force fm and a contact force fs. For example, supposing an upward direction in the Z axis is positive and a downward direction in the Z axis is negative in an operation coordinate system and a robot coordinate system, the history operating force fm is a negative value and the contact force fs is a positive value in general. Similarly, the limiting value fm−maxm is a negative value, and the limiting value fs−max is a positive value. In FIG. 11, the history operating force fm and the contact force fs are expressed as absolute values. The abscissa in the graph represents no specific meanings. For example, the abscissa may represent time. In the graph, the absolute value of the history operating force fm is indicated by a chain double-dashed line, the absolute value of the contact force fs is indicated by a broken line, and the rigidity coefficient kd is indicated by a solid line. This graph shows a change of the rigidity coefficient kd with a change of the absolute value of the history operating force fm, and a change of the rigidity coefficient kd with a change of the absolute value of the contact force fs. Changes of the history operating force fm and the contact force fs in the graph do not show actual changes of the actual history operating force fm and the contact force fs.

First, supposing that the absolute value of the contact force fs is constant at zero and the history operating force fm linearly increases in a negative direction, that is, the absolute value of the history operating force fm linearly increases. In this case, the rigidity coefficient kd increases as shown in the graph. When the absolute value of the history operating force fm reaches the absolute value of the limiting value fm−max, the rigidity coefficient kd becomes at maximum.

Next, supposing that the absolute value of the history operating force fm is constant at the absolute value of the limiting value fm−max and the contact force fs linearly increases in a positive direction, that is, the absolute value of the contact force fs linearly increases. In this case, the rigidity coefficient kd decreases as shown in the graph. When the absolute value of the contact force fs reaches the absolute value of the limiting value fs−max, the rigidity coefficient kd becomes zero.

As shown in the graph, when the absolute value of the history operating force fm increases, that is, the history operating force fm increases as a force, the rigidity coefficient kd tends to increase. Consequently, the grinding device 11a is strongly pushed against the object W. On the other hand, when the absolute value of the contact force fs increases, that is, the contact force fs increases as a force, the rigidity coefficient kd tends to decrease. That is, when the contact force fs becomes excessive, a pressing force of the grinding device 11a decreases.

In the manner described above, in the elasticity control, the rigidity coefficient kd is changed in accordance with the history operating force fm and the contact force fs so that a pressing force of the grinding device 11a against the object W can be appropriately changed in accordance with the history operating force fm and the contact force fs.

In addition, since the history operating force fm at this time is a force recorded as an operation history, the rigidity coefficient kd is adjusted in accordance with the history operating force fm in an actual job of the user. For example, in a portion against which the user strongly presses the grinding device 11a in an actual job, the rigidity coefficient kd also increases so that a pressing force of the grinding device 11a increases in the second control.

<Variation of Second Control>

Figure 12:
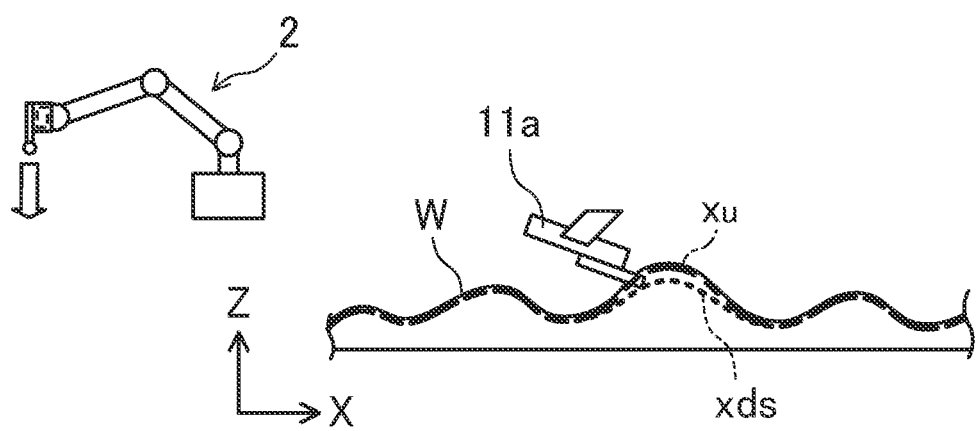
FIG. 12 schematically illustrates an operation of a grinding device in second control according to a variation.

A variation of the second control will now be described. FIG. 12 schematically illustrates movement of the grinding device 11a in second control according to a variation.

In the second control according to the variation, the controller 3 also generates instructed positions xds for the robot 1 based on the trajectory data xu and the operating forces fm. The operating forces fm used in this generation are operating forces fm detected by the operating force sensor 23 based on an operation of the handle 21 in the second control. That is, the user operates the operator 2 in the second control. The controller 3 uses the operating forces fm detected by the operating force sensor 23 in real time in the second control for generation of the instructed positions xds.

Specifically, the controller 3 generates the instructed positions xds for the robot 1 based on the trajectory data xu as described above. The force-speed converter 64 obtains instructed speeds xd' by converting the trajectory data xu to history speeds xu' and substituting the history speeds xu' in Equation (2). At this time, in a case where the operating forces fm are recorded as an operation history, the force-speed converter 64 substitutes the recorded operating forces fm in Equation (2).

Based on the thus-obtained instructed speeds xd', instructed positions xds are finally generated. The robot controller 14 controls the robot 1 based on the generated instructed positions xds, and controls the position of the grinding device 11a.

Accordingly, the grinding device 11a performs grinding, while following the trajectory data xu. In the case where the operating force fm is recorded in the operation history, the grinding device 11a is further affected by the operating force fm and moves.

The user operates the operator 2 during reproduction of an operation history of, for example, the trajectory data xu, thereby adding the operating force fm.

For example, the case of grinding an object W as illustrated in FIG. 12 will be described. FIG. 12 schematically illustrates movement of the grinding device 11a in second control according to a variation. The surface of the object W is uneven in the Z direction, and this uneven pattern spreads in the X direction. The trajectory data xu is constant in the Y component and fluctuates in the Z component with a change of the X component, and waves in the Z direction in a manner similar to the surface of the object W.

In general, the grinding device 11a performs grinding to follow the trajectory data xu. In a case where the user intends to increase a pressing force of the grinding device 11a against the object W while observing grinding of the grinding device 11a, the user can add the operating force fm by operating the operator 2. In obtaining the instructed speeds xd' based on Equation (2), the controller 3 also substitutes an additional operating force fm in Equation (2). Accordingly, the instructed positions xds are adjusted to increase a pressing force of the grinding device 11a. In this manner, the pressing force of the grinding device 11a is adjusted in real time.

In this example, during the second control, the controller 3 does not generate or output the instructed positions xdm for the operator 2. That is, the handle 21 of the operator 2 is stopped. The user operates the stopped handle 21 as necessary. Since the handle 21 is stopped, the user can easily adjust an operating force fm to be added.

It should be noted that the controller 3 may generate instructed positions xdm for the operator 2 and output the instructed positions xdm to the operator 2. In this case, the user can sense a reaction force from the object W by holding the handle 21. That is, the user can add the operating force fm, while sensing a reaction force from the object W.

As described above, the robot system 100 includes: an operator 2 (master device) that is operated by a user; a robot 1 (slave device) including an end effector 11 (effector) that applies a treatment to an object W and a robot arm 12 (mover) that moves the end effector 11; and a controller 3 that controls the robot 1. The controller 3 performs first control of controlling the robot arm 12 in accordance with an operation with the operator 2 to thereby cause the end effector 11 to apply a treatment to the object W and of recording trajectory information, that is, trajectory data xu, related to a moving trajectory of the end effector 11, and second control of controlling the robot arm 12 based on the trajectory data xu recorded in the first control to thereby move the end effector 11 such that the end effector 11 reproduces the moving trajectory and applies a treatment to the object W. In the second control, in controlling the robot arm 12 based on the trajectory data xu, the controller 3 controls a pressing force of the end effector 11 against the object W.

In other words, a method for controlling a robot system 100 including an operator 2 that is operated by a user and a robot 1 including an end effector 11 that applies a treatment to an object W and a robot arm 12 that moves the end effector 11 includes: performing first control of controlling the robot arm 12 in accordance with an operation with the operator 2 to thereby cause the end effector 11 to apply a treatment to the object W and of recording trajectory information, that is, trajectory data xu, related to a moving trajectory of the end effector 11; and performing second control of controlling the robot arm 12 based on the trajectory data xu recorded in the first control to thereby move the end effector 11 such that the end effector 11 reproduces the moving trajectory and applies a treatment to the object W. In the second control, a pressing force of the end effector 11 against the object W is controlled in controlling the robot arm 12 based on the trajectory data xu.

With these configurations, in the first control, the robot arm 12 is controlled in accordance with an operation of the operator 2 by the user so that the end effector 11 applies a treatment to the object W and trajectory data xu of the end effector 11 at this time is recorded. Then, in the second control, the robot arm 12 is controlled based on the trajectory data xu recorded in the first control so that the end effector 11 applies a treatment to the object W. At this time, the end effector 11 moves to generally reproduce a moving trajectory with a pressing force of the end effector 11 against the object W controlled. Accordingly, in the first control, the end effector 11 moves to generally reproduce a moving trajectory in a case where the user manually controls the robot arm 12 with the operator 2, and a pressing force of the end effector 11 against the object W at this time is controlled. As a result, the robot system 100 can reproduce movement of the grinding device 11a that easily imitates complicated operation and complicated force exertion actually performed by a user.

The operator 2 includes a handle 21 that is operated by the user and an operating force sensor 23 (operating force detector) that detects an operating force exerted on the handle 21 from the user. The controller 3 controls the robot arm 12 in accordance with the operating force detected by the operating force sensor 23 as an operation with the operator 2 in the first control, and controls the robot arm 12 based on the operating force in addition to the trajectory data xu in the second control.

With this configuration, in the second control, an operating force from the user is taken into consideration in addition to the trajectory data xu so that a pressing force of the end effector 11 against the object W is controlled. An operating force is a force directly related to a pressing force of the end effector 11 against the object W, and therefore, is used for controlling the robot arm 12 in the first control. That is, by taking an operating force into consideration for controlling the robot arm 12 in the second control, the pressing force of the end effector 11 against the object W can be easily controlled.

As an example, in recording the trajectory data xu, the controller 3 also records the operating force fm detected by the operating force sensor 23 in the first control, and the operating force fm used for controlling the robot arm 12 in the second control is an operating force fm recorded in the first control.

With this configuration, the operating forces fm used for controlling the robot arm 12 in the second control are operating forces fm of the operating force sensor 23 recorded together with the trajectory data xu in the first control. That is, the pressing force of the end effector 11 against the object W is controlled in the second control by using an operating force fm in generating trajectory data xu to be reproduced in the second control. Consequently, in the second control, the trajectory data xu and the operating forces fm in the first control are reproduced.

Each of the trajectory data xu and the operating forces fm includes components of directions, and in the second control, the controller 3 is capable of selecting a component of a direction to be used in controlling the robot arm 12 from the components of the directions included in the trajectory data xu and selecting a component of a direction to be used in controlling the robot arm 12 from the components of the directions included in the operating force fm.

With this configuration, it is possible to select a direction in which the trajectory data xu is reproduced and a direction in which a pressing force of the end effector 11 by the operating force fm is controlled. That is, the trajectory data xu is reproduced dominantly in one direction, a pressing force of the end effector 11 is controlled dominantly in another direction, and both reproduction of the trajectory data xu and control of the pressing force of the end effector 11 are performed with priority in yet another direction. For some objects W and work jobs, a direction in which the user wants to perform reproduction of the trajectory data xu with priority and a direction in which the user wants to perform control of the pressing force of the end effector 11 with priority are previously determined. The robot system 100 can flexibly address such a situation.

As another example in the case of using the operating force fm for controlling the robot arm 12 in the second control, the operating force fm used for controlling the robot arm 12 in the second control may be an operating force fm detected by the operating force sensor 23 based on an operation of the operator 2 in the second control.

With this configuration, while the position of the end effector 11 is controlled to reproduce the trajectory data xu in the second control, the pressing force of the end effector 11 against the object W is adjusted based on the operating force fm input by an operation of the operator 2 in real time. That is, the user can adjust the pressing force of the end effector 11 in real time by operating the operator 2 as necessary, while monitoring position control of the end effector 11 based on the operation history in the first control.

The robot system 100 further includes a contact force sensor 13 (contact force detector) that detects a contact force fs, the contact force fs being a reaction force exerted on the end effector 11 from the object W. The controller 3 controls the robot arm 12 in accordance with the operating force fm and the contact force fs by using motion models of the end effector 11 and the robot arm 12 based on an equation of motion including an inertia coefficient md, a viscosity coefficient cd, and a rigidity coefficient kd in the first control and the second control With this configuration, the robot arm 12 can be controlled in consideration of imaginary inertia, viscosity, and elasticity of the end effector 11 and the robot arm 12.

For example, the controller 3 is capable of selecting presence or absence of the rigidity coefficient kd in the second control.

With this configuration, in a motion model, it is possible to select whether elasticity of the end effector 11 and the robot arm 12 is taken into consideration or not. For example, in the case of not considering elasticity, a damping force based on the viscosity coefficient cd is dominant in the motion model. In such a model, in a case where a difference is present between the surface of the object W and a trajectory indicated by the trajectory data xu, the grinding device 11a moves to follow the surface of the object W in accordance with the operating force fm.

In addition, the controller 3 changes the rigidity coefficient kd in accordance with the operating force fm and the contact force fs in the second control.

With this configuration, the rigidity coefficient kd is changed in accordance with the operating force fm and the contact force fs so that a pressing force of the end effector 11 can be thereby controlled in accordance with the operating force fm and the contact force fs. Specifically, the rigidity coefficient kd is increased as the operating force fm increases and/or the contact force fs decreases so that the pressing force of the end effector 11 can be thereby increased. On the other hand, the rigidity coefficient kd is reduced as the operating force fm decreases and/or the contact force fs increases so that the pressing force of the end effector 11 can be thereby reduced. In addition, the rigidity coefficient kd is limited in accordance with the operating force fm and the contact force fs so that if the operating force fm or the contact force fs is excessively large, the rigidity coefficient kd is limited and, thereby, damage of the end effector 11 is prevented or reduced.

The robot system 100 further includes a contact force sensor 13 that detects a contact force, the contact force being a reaction force exerted on the end effector 11 from the object W. The controller 3 calculates position-related information, for example, an instructed speed xd', related to a position of the end effector 11 based on the operating force fm and the contact force fs, generates an instructed position xds of the end effector 11 and an instructed position xdm of the handle 21 related to the instructed position xds of the end effector 11 based on the position-related information, and controls the robot arm 12 based on the instructed position xds of the end effector 11, while controlling the operator 2 based on the instructed position xdm of the handle 21. The trajectory information is at least one of the position-related information, the instructed position xds of the end effector 11, or the instructed position xdm of the handle 21.

Other Embodiments

In the foregoing description, the embodiments have been described as an example of the technique disclosed in the present application. The technique disclosed here, however, is not limited to these embodiments, and is applicable to other embodiments obtained by changes, replacements, additions, and/or omissions as necessary. Components described in the above embodiments may be combined as a new exemplary embodiment. Components included in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

For example, in the second control, an operating force to be used in controlling a pressing force of the end effector 11 against the object W is not limited to the history operating force fm in the first control, and the operating force fm based on an operation of the handle 21 in the second control. For example, a preset operating force fm may be used for controlling a pressing force of the end effector 11 against the object W, that is, may be substituted in Equation (2). That is, an operating force to be used in controlling a pressing force of the end effector 11 against the object W may not an operating force through the operator 2 and may be a preset operating force.

The trajectory data xu recorded in the first control is not limited to the instructed positions xdm, and may be instructed positions xds or instructed speeds xd'. The trajectory data xu recorded in the first control may be position-related information related to the positions of the end effector 11. In the example described above, the instructed speeds xd' is calculated from the resultant force fm+fs, and the instructed speed xd' corresponds to the position-related information. It should be noted that in the case of calculating the instructed position xd from the resultant force fm+fs, the instructed position xd corresponds to the position-related information.

The method for calculating the instructed positions xds and the instructed positions xdm from the resultant forces fm+fs described above is merely an example. The motion model is merely an example, and another motion model may be used.

The block diagram described above is an example, and blocks may be implemented as one block, one block may be divided into blocks, or some functions may be transferred to another block.

The technique disclosed here may be a program for executing the control method, and may be a non-transitory computer-readable recording medium in which the program is recorded. The program may be distributed via a transmission medium such as the Internet.

Functions of the configuration disclosed in this embodiment may be performed by using an electric circuit or a processing circuit. A processor is, for example, a processing circuit including a transistor and other circuits. In this disclosure, a unit, a controller, or a means is hardware or is programmed to perform the described functions. The hardware therein is hardware disclosed in this embodiment or known hardware configured or programmed to perform functions disclosed in this embodiment. In a case where the hardware is a processor or a controller, a circuit, a means, or a unit is a combination of hardware and software, and the software is used for configuring hardware and/or a processor.

The invention claimed is:

1. A robot system comprising:
   a master device that is capable of being operated by a user;
   a slave device including an effector that applies a treatment to an object and a mover that moves the effector; and
   a controller that controls the slave device, wherein
   the controller performs operations comprising
      first control of controlling the mover in accordance with an operating force generated by an operation with the master device to thereby cause the effector to apply a treatment to the object and of recording trajectory information related to a moving trajectory of the effector and recording the operating force generated by the operation with the master device, including X, Y and Z direction components of the operating force, and
      second control of controlling the mover based on the trajectory information recorded in the first control to thereby move the effector such that the effector reproduces the moving trajectory and applies a treatment to the object,
   in the second control, in controlling the mover based on the trajectory information, the controller controls a pressing force of the effector against the object,
   each of the trajectory information and the operating force includes one or more direction components comprising components in and around mutually orthogonal X, Y, and Z axis directions, and
   in the second control, the controller performs operations further comprising:
      using the X and Y direction components of the operating force recorded in the first control, in controlling the trajectory of the mover and using the Z direction component of the operating force recorded in the first control, to control the operating force of the mover.

2. The robot system according to claim 1, wherein
   the master device includes a handle that is capable of being operated by the user and an operating force detector that detects the operating force exerted on the handle, and the controller performs operations further comprising
controlling the mover in accordance with the operating force detected by the operating force detector as an operation with the master device in the first control, and
controlling the mover based on the operating force in addition to the trajectory information in the second control.

3. The robot system according to claim 2, wherein the operating force to be used in controlling the mover in the second control is an operating force detected by the operating force detector based on an operation of the handle in the second control.

4. The robot system according to claim 2, further comprising
a contact force detector that detects a contact force, the contact force being a reaction force exerted on the effector from the object, wherein
the controller controls the mover in accordance with the operating force and the contact force by using motion models of the mover and the effector based on an equation of motion including an inertia coefficient, a viscosity coefficient, and a rigidity coefficient in the first control and the second control.

5. The robot system according to claim 4, wherein the controller is capable of selecting presence or absence of the rigidity coefficient in the second control.

6. The robot system according to claim 4, wherein the controller performs operations further comprising
changing the rigidity coefficient in accordance with the operating force and the contact force in the second control.

7. The robot system according to claim 2, further comprising
a contact force detector that detects a contact force, the contact force being a reaction force exerted on the effector from the object, wherein
in the first control, the controller performs operations further comprising
calculating position-related information related to a position of the effector based on the operating force and the contact force,
generating instructed positions of the effector and instructed positions of the handle related to the instructed positions of the effector based on the position-related information, and
controlling the mover based on the instructed positions of the effector, while controlling the master device based on the instructed positions of the handle, and
the trajectory information is at least one of the position-related information, the instructed positions of the effector, or the instructed positions of the handle.

8. A control method for a robot system including a master device that is capable of being operated by a user and a slave device including an effector that applies a treatment to an object and a mover that moves the effector, the method comprising:
performing first control of controlling the mover in accordance with an operating force generated by an operation with the master device to thereby cause the effector to apply a treatment to the object and of recording trajectory information related to a moving trajectory of the effector and recording the operating force generated by the operation with the master device, including X, Y and Z direction components of the operating force; and
performing second control of controlling the mover based on the trajectory information recorded in the first control to thereby move the effector such that the effector reproduces the moving trajectory and applies a treatment to the object, wherein
in the second control, in controlling the mover based on the trajectory information, a pressing force of the effector against the object is controlled,
each of the trajectory information and the operating force includes one or more direction components comprising components in and around mutually orthogonal X, Y, and Z axis directions, and
the second control further comprises:
using X and Y direction components of the operating force recorded in the first control, in controlling the trajectory of the mover and using the Z direction component of the operating force recorded in the first control, to control the operating force of the mover.

9. The control method according to claim 8, wherein the master device includes a handle that is capable of being operated by the user and an operating force detector that detects the operating force exerted on the handle,
in the first control, the mover is controlled in accordance with an operating force detected by the operating force detector, as an operation with the master device, and
in the second control, the mover is controlled based on the operating force in addition to the trajectory information.

10. The control method according to claim 9, wherein the operating force comprises operating forces,
in the first control, the operating forces detected by the operating force detector are recorded together with the trajectory information, and
the operating forces to be used for controlling the mover in the second control are operating forces recorded in the first control.

11. The control method according to claim 10, wherein in the second control, a part of the second of the one or more direction components included in the operating forces are used for controlling the mover, and another part of the first of the one or more direction components included in the trajectory information are used for controlling the mover.

12. The control method according to claim 9, wherein the operating force to be used in controlling the mover in the second control is an operating force detected by the operating force detector based on an operation of the handle in the second control.

13. The control method according to claim 9, wherein the robot system further includes a contact force detector that detects a contact force, the contact force being a reaction force exerted on the effector from the object, and
in the first control and the second control, the mover is controlled in accordance with the operating force and the contact force by using motion models of the mover and the effector based on an equation of motion including an inertia coefficient, a viscosity coefficient, and a rigidity coefficient.

14. The control method according to claim 13, wherein in the second control, presence or absence of the rigidity coefficient is selectable.

15. The control method according to claim 13, wherein in the second control, the rigidity coefficient changes in accordance with the operating force and the contact force.

16. The method according to claim 9, wherein
the robot system further includes a contact force detector that detects a contact force, the contact force being a reaction force exerted on the effector from the object, and in the first control,
- position-related information related to a position of the effector is calculated based on the operating force and the contact force,
- instructed positions of the effector and instructed positions of the handle related to the instructed positions of the effector are generated based on the position-related information,
- the mover is controlled based on the instructed positions of the effector, whereas the master device is controlled based on the instructed positions of the handle, and
- the trajectory information is at least one of the position-related information, the instructed positions of the effector, or the instructed positions of the handle.

17. A robot system comprising:
a master device that is capable of being operated by a user;
a slave device including an effector that applies a treatment to an object and a mover that moves the effector; and
a controller that controls the slave device, wherein
the controller performs operations comprising
- first control of controlling the mover in accordance with an operating force generated by an operation with the master device to thereby cause the effector to apply a treatment to the object and of recording trajectory information related to a moving trajectory of the effector and recording the operating force generated by the operation with the master device, including X, Y and Z direction components of the operating force, and
- second control of controlling the mover based on the trajectory information recorded in the first control to thereby move the effector such that the effector reproduces the moving trajectory and applies a treatment to the object,
in the second control, in controlling the mover based on the trajectory information, the controller controls a pressing force of the effector against the object,
each of the trajectory information and the operating force includes one or more direction components comprising components in and around mutually orthogonal X, Y, and Z axis directions, and
in the second control, the controller performs operations further comprising
- using the X and Y direction components of the operating force recorded in the first control in controlling the trajectory of the mover and using the Z direction component of the operating force recorded in the first control, to control the operating force of the mover.

18. A control method for a robot system including a master device that is capable of being operated by a user and a slave device including an effector that applies a treatment to an object and a mover that moves the effector, the method comprising:
- performing first control of controlling the mover in accordance with an operating force generated by an operation with the master device to thereby cause the effector to apply a treatment to the object and of recording trajectory information related to a moving trajectory of the effector and recording the operating force generated by the operation with the master device, including X, Y and Z direction components of the operating force; and
- performing second control of controlling the mover based on the trajectory information recorded in the first control to thereby move the effector such that the effector reproduces the moving trajectory and applies a treatment to the object, wherein
in the second control, in controlling the mover based on the trajectory information, a pressing force of the effector against the object is controlled,
each of the trajectory information and the operating force includes one or more direction components comprising components in and around mutually orthogonal X, Y, and Z axis directions, and
the second control further comprises:
- using the X and Y direction components of the operating force recorded in the first control in controlling the trajectory of the mover and using the Z direction component of the operating force recorded in the first control, to control the operating force of the mover.

* * * * *